US007832616B2

(12) United States Patent
Lin et al.

(10) Patent No.: US 7,832,616 B2
(45) Date of Patent: Nov. 16, 2010

(54) METHODS OF SECURING A THERMOCOUPLE TO A CERAMIC SUBSTRATE

(75) Inventors: Hongy Lin, Chesterfield, MO (US); Jason E. Smith, St. Louis, MO (US); Daniel J. Block, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 237 days.

(21) Appl. No.: 11/970,541

(22) Filed: Jan. 8, 2008

(65) Prior Publication Data

US 2008/0110963 A1 May 15, 2008

Related U.S. Application Data

(62) Division of application No. 11/411,579, filed on Apr. 26, 2006.

(51) Int. Cl.
*B23K 31/02* (2006.01)

(52) U.S. Cl. ................ 228/122.1; 228/180.5; 228/246; 228/248.1

(58) Field of Classification Search ....................... None
See application file for complete search history.

(56) References Cited

U.S. PATENT DOCUMENTS

| | | | |
|---|---|---|---|
| 3,923,551 A * | 12/1975 | Purdy | 136/201 |
| 3,979,187 A | 9/1976 | Scherer | |
| 4,596,354 A | 6/1986 | Moorhead | |
| 4,602,731 A | 7/1986 | Dockus | |
| 4,770,953 A | 9/1988 | Horiguchi et al. | |
| 4,787,551 A * | 11/1988 | Hoyt et al. | 228/179.1 |
| 5,005,421 A | 4/1991 | Hegner et al. | |
| 5,176,451 A * | 1/1993 | Sasada et al. | 374/179 |
| 5,334,344 A | 8/1994 | Hegner et al. | |
| 5,539,611 A | 7/1996 | Hegner et al. | |
| 5,670,063 A * | 9/1997 | Hegner et al. | 219/85.22 |
| 5,794,838 A | 8/1998 | Ushikoshi et al. | |
| 5,877,475 A * | 3/1999 | Hecht et al. | 219/448.11 |
| 5,954,900 A | 9/1999 | Hegner et al. | |
| 6,039,918 A | 3/2000 | Hegner et al. | |
| 6,082,609 A * | 7/2000 | Wienand et al. | 228/122.1 |
| 6,268,069 B1 | 7/2001 | Ohashi et al. | |
| 6,348,273 B1 | 2/2002 | Ishikawa et al. | |

(Continued)

FOREIGN PATENT DOCUMENTS

| | | |
|---|---|---|
| EP | 1204299 | 5/2002 |

(Continued)

OTHER PUBLICATIONS

Machine translation of JP-5-52668A.*

(Continued)

*Primary Examiner*—Kiley Stoner
(74) *Attorney, Agent, or Firm*—Brinks Hofer Gilson & Lione

(57) ABSTRACT

Methods of securing a thermocouple to a ceramic substrate are provided. The thermocouple includes a pair of wires that define a junction, and the method comprises directly bonding the junction of the thermocouple to the ceramic substrate. In one form, the junction is directly bonded using an active brazing material.

24 Claims, 10 Drawing Sheets

U.S. PATENT DOCUMENTS

| | | | | |
|---|---|---|---|---|
| 6,354,484 | B1 | 3/2002 | Sakuraba et al. | |
| 6,533,161 | B1 | 3/2003 | Gessner | |
| 6,732,914 | B2 | 5/2004 | Cadden et al. | |
| 2002/0134775 | A1 * | 9/2002 | Ohashi et al. | 219/444.1 |
| 2002/0155020 | A1 | 10/2002 | Hegner et al. | |
| 2004/0026402 | A1 * | 2/2004 | Ito et al. | 219/444.1 |
| 2004/0149719 | A1 * | 8/2004 | Nakamura | 219/444.1 |
| 2006/0243776 | A1 * | 11/2006 | Tada et al. | 228/101 |
| 2007/0117977 | A1 * | 5/2007 | Andersen et al. | 544/86 |

FOREIGN PATENT DOCUMENTS

| | | | | |
|---|---|---|---|---|
| EP | 1220302 | | | 7/2002 |
| EP | 1225790 | | | 7/2002 |
| EP | 1341216 | | | 9/2003 |
| EP | 1463381 | | | 9/2004 |
| JP | 4095832 | | | 3/1992 |
| JP | 5-52668 | A | * | 3/1998 |
| JP | 2000-47179 | A | * | 2/2000 |

OTHER PUBLICATIONS

Y.H. Chiao et al., "Interfacial Bonding in Brazed and Cofied Aluminum Nitride", ISHM 91 Proceedings, 1991, pp. 460-468.

International Search Report for PCT/US2007/010157.

* cited by examiner

METHODS OF SECURING A THERMOCOUPLE TO A CERAMIC SUBSTRATE

CROSS-REFERENCE TO RELATED APPLICATIONS

This application is a divisional of U.S. application Ser. No. 11/411,579 filed on Apr. 26, 2006. The disclosure of the above application is incorporated herein by reference.

FIELD

The present disclosure relates generally to electric heaters, and more particularly to ceramic heaters and methods of securing thermocouples to the ceramic heaters.

BACKGROUND

The statements in this section merely provide background information related to the present disclosure and may not constitute prior art.

A typical ceramic heater generally includes a ceramic substrate and a resistive heating element either embedded within or secured to an exterior surface of the ceramic substrate. Heat generated by the resistive heating element can be rapidly transferred to a target object disposed proximate the ceramic substrate because of the excellent heat conductivity of ceramic materials.

Ceramic materials, however, are known to be difficult to bond to metallic materials due to poor wettability of ceramic materials and metallic materials. Many of the ceramic materials and the metallic materials are non-wetting, making it difficult to cause a molten metal to flow into the pores of a ceramic material against capillary pressure. Moreover, the difference in coefficient of thermal expansion between the ceramic material and the metallic material is great and thus a bond between the ceramic material and the metallic material is difficult to maintain at a high temperature.

Therefore, a thermocouple used with the ceramic heater is generally attached to the ceramic substrate through a metal sheath. The hot junction, or measuring junction, of the thermocouple for measuring temperature of the ceramic heater is received within and welded to the metal sheath, which in turn is secured to the ceramic substrate. The sheath is typically disposed in the proximity of the ceramic substrate by mechanical attachment, such as a spring loaded device.

This conventional method of securing the thermocouple to the ceramic heater has a disadvantage of delayed temperature response because the thermocouple measures the temperature of the metal sheath, rather than directly measuring the temperature of the ceramic substrate. Also the large thermal mass of the sheath tends to further delay the temperature change in the thermocouple. Therefore, an accurate temperature measurement by the thermocouple depends on the thermal characteristics of the metal sheath. When the ceramic heater is ramped at a very fast rate, the thermocouple may not accurately measure the temperature of the ceramic heater instantaneously if the metal sheath does not respond rapidly to the temperature change of the ceramic substrate. Accordingly, in a ceramic heater powered at a relatively high power density and ramped at a relatively fast rate, "overshooting" is likely to occur, which refers to an undesirable control of a parameter when the transition of the parameter from a lower value to a higher value exceeds the final value. Because of the inability to accurately measure and control the temperature over a ramping profile, the ceramic heater may be raised to a temperature exceeding the target temperature, resulting in an undesirable heating of the target object.

SUMMARY

In one form, a method of securing a thermocouple including a pair of wires that define a junction to a ceramic substrate is provided. The method includes directly bonding the junction of the thermocouple to the ceramic substrate.

In another form, a method of securing a thermocouple including a pair of wires to a ceramic substrate is provided. The method comprises: welding the wires of the thermocouple to form a junction; cleaning a surface of the ceramic heater substrate; applying an active brazing material onto the surface of the ceramic heater substrate; placing the junction on the active brazing material; drying the active brazing material; heating the active brazing material in a vacuum chamber; maintaining the active brazing material at a predetermined temperature and time in the vacuum chamber; and cooling to room temperature.

According to another method, a thermocouple including a pair of wires that define a junction is secured to a ceramic substrate. The method comprises directly bonding the junction of the thermocouple to the ceramic substrate, wherein the directly bonding is achieved by using an active brazing material.

In still another method, a thermocouple comprising a pair of wires is secured to a ceramic substrate. The method comprises cleaning a surface of the ceramic substrate, applying a metallized layer to the surface of the ceramic substrate, applying an ordinary brazing material onto the metallized layer, placing a junction of the thermocouple on the ordinary brazing material, heating the ordinary brazing material, maintaining the ordinary brazing material at a predetermined temperature and cooling the active brazing material to room temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the invention may be well understood, there will now be described an embodiment thereof, given by way of example, reference being made to the accompanying drawing, in which.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
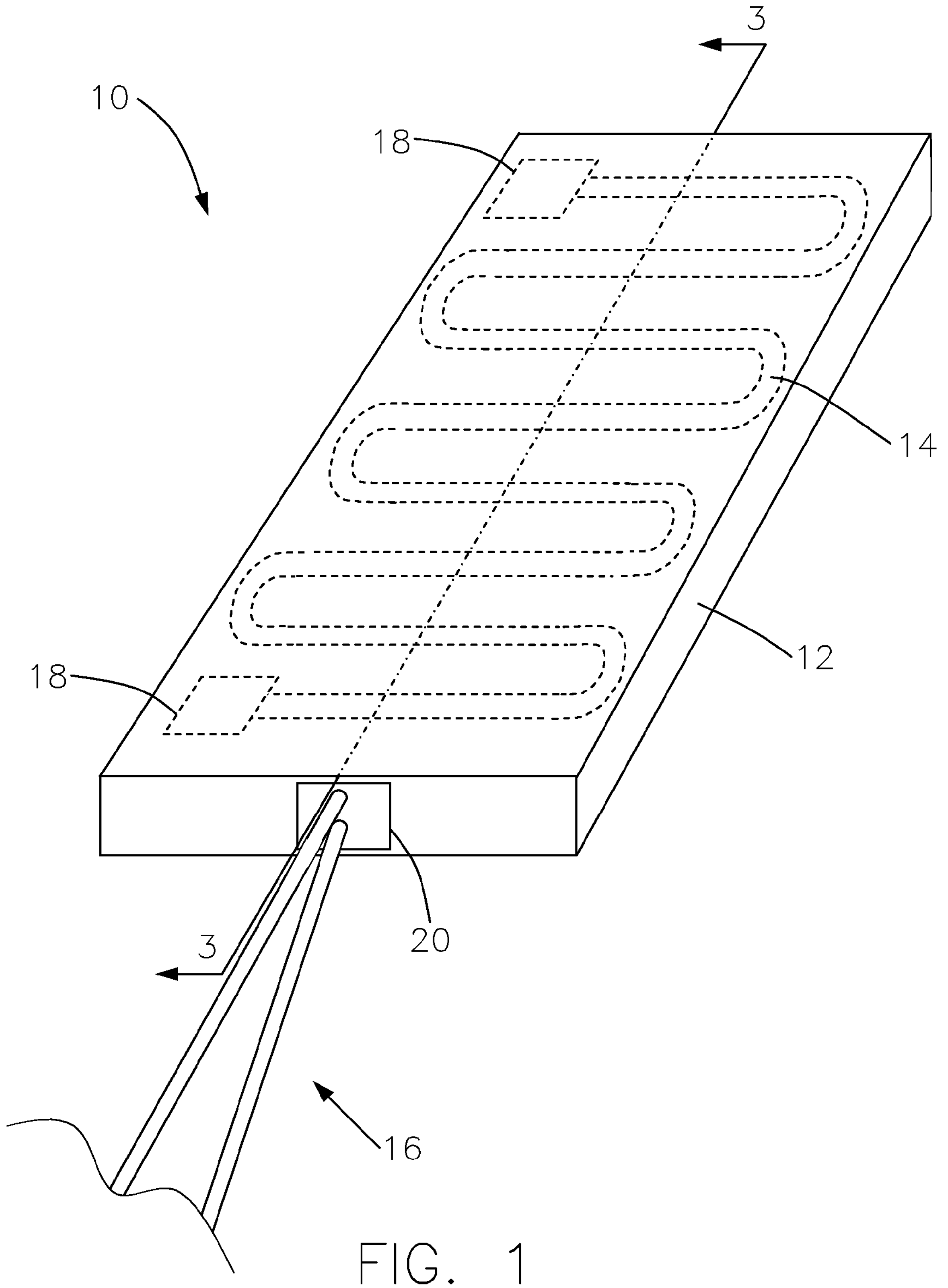
FIG. 1 is a perspective view of a ceramic heater with a thermocouple secured thereto constructed in accordance with the teachings of the present disclosure.
Figure 2:
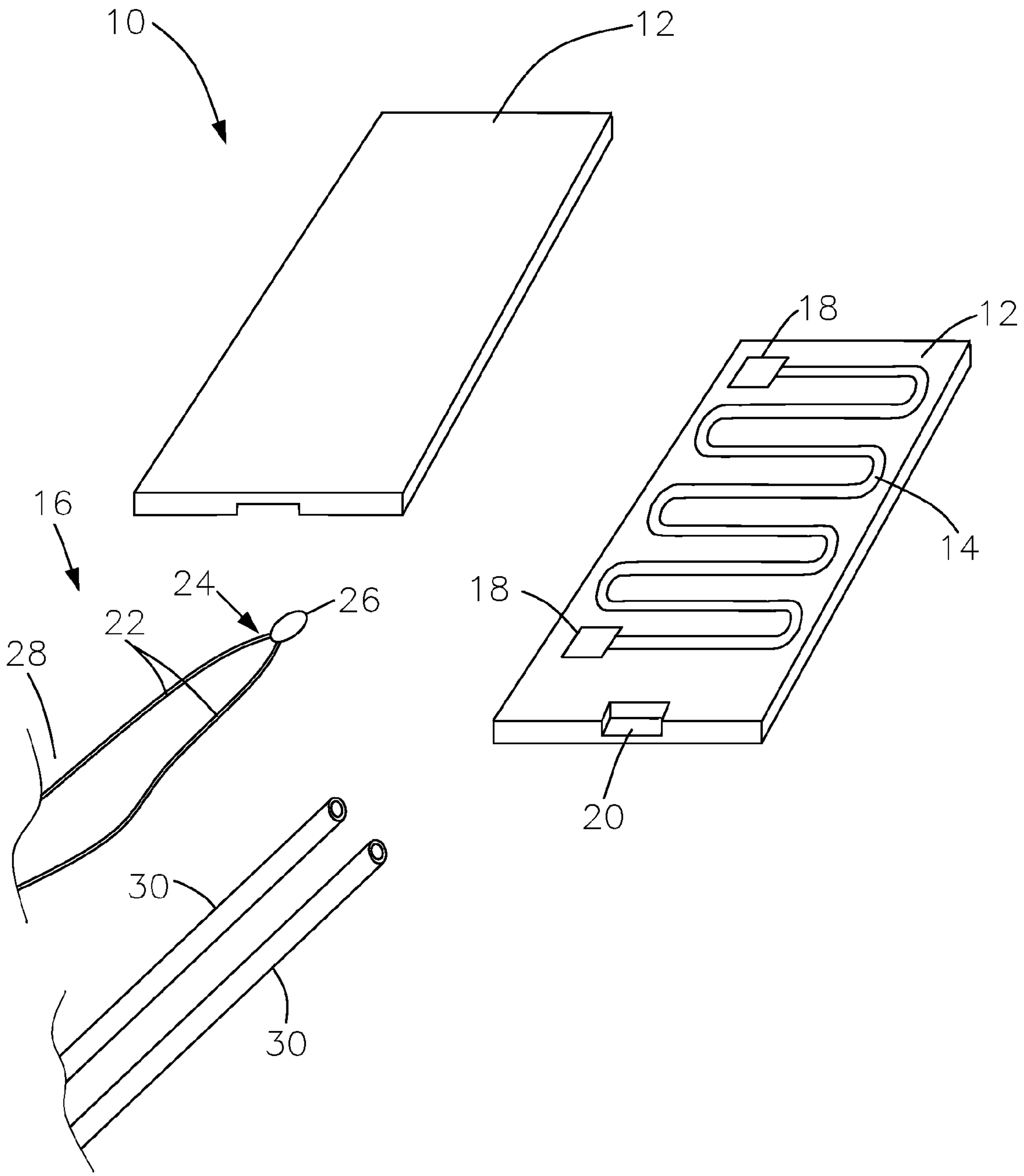
FIG. 2 is an exploded perspective view of the ceramic heater with the thermocouple of FIG. 1 in accordance with the teachings of the present disclosure.
Figure 3:
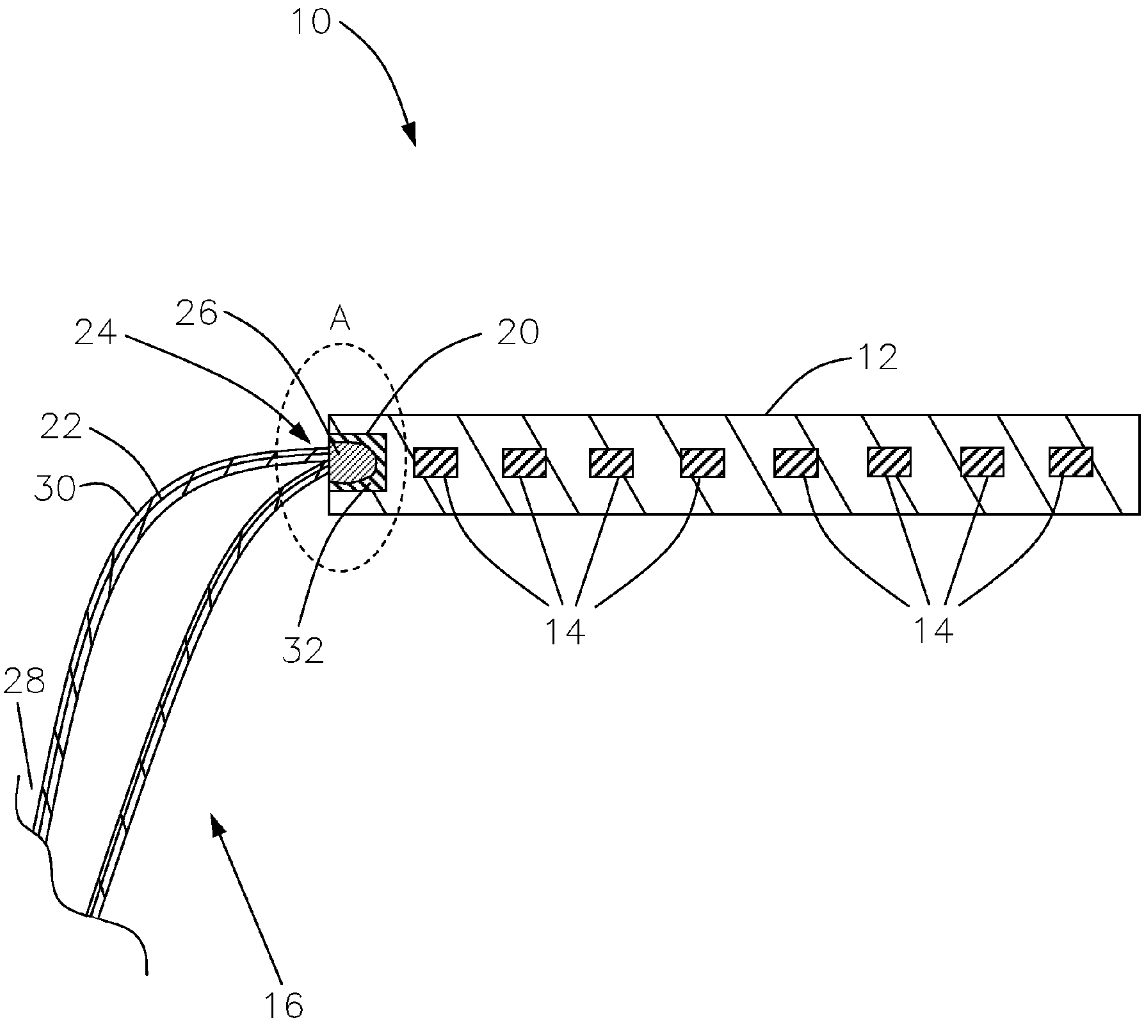
FIG. 3 is a cross-sectional view of the ceramic heater and the thermocouple, taken along line 3-3 of FIG. 1 in accordance with the teachings of the present disclosure.

Referring to FIGS. 1 to 3, a ceramic heater constructed in accordance with the teachings of the present disclosure is illustrated and generally indicated by reference number 10. The ceramic heater 10 includes a ceramic substrate 12, a resistive heating element 14 (shown dashed) embedded within the ceramic substrate 12, and a thermocouple 16. The resistive heating element 14 is terminated at two terminal pads 18 (shown dashed) on which lead wires (not shown) are attached for connecting the resistive heating element 14 to a power source (not shown). The ceramic substrate 12 is preferably made of aluminum nitride (AlN), alumina ($Al_2O_3$), or silicon nitride ($Si_3N_4$). However, these materials are exemplary only, and it should be understood that other ceramic materials may be employed while remaining within the scope of the present disclosure. The resistive heating element 14 can be of any type known in the art, such as, by way of example, a resistive coil, or a resistive film, among others. While the resistive heating element 14 is shown to be embedded within the ceramic substrate 12, the resistive heating element 14 can be disposed on an exterior surface of the ceramic substrate 12 without departing from the spirit of the present disclosure.

The thermocouple 16 is secured to the ceramic substrate 12, and is preferably disposed within a recess 20, for measuring the temperature of the ceramic substrate 12 during operation of the ceramic heater 10. Depending on the dimensions of the ceramic substrate 12 and the arrangement of the resistive heating element 14, more than one thermocouple 16 can be attached to the ceramic heater 10 while remaining within the scope of the present invention. For example, if the ceramic heater 10 has multiple heating zones (not shown), it might be preferable to have multiple thermocouples 16 corresponding to the multiple heating zones in order to individually measure and control the multiple heating zones.

As more clearly shown in FIG. 2, the thermocouple 16 includes a pair of conductive wires 22 made of dissimilar metals. The conductive wires 22 include distal ends 24 that are preferably welded together, therefore forming a bead 26. Additionally, the thermocouple 16 includes proximal ends 28 adapted for connection to a controller or other temperature processing device/circuit (not shown), such that the conductive wires 22, the bead 26, and the controller form an electrical circuit. The bead 26 functions as a hot junction, or a measuring junction, and is placed proximate the ceramic substrate 12. The proximal ends 28 function as a cold junction, or a reference junction. As the temperature of the ceramic substrate 12 and subsequently the bead 26 increases, a voltage is generated across the electrical circuit. By measuring the voltage across the electrical circuit, a temperature difference between the bead 26 and the cold junction can be determined, and thus the temperature of the bead 26, and subsequently the ceramic substrate 12, is obtained.

Preferably, the thermocouple 16 further includes a pair of insulation sleeves 30. As more clearly shown in FIG. 4, the insulation sleeves 30 surround the conductive wires 22 with a portion of the distal ends 24 of the conductive wires 22 protruding from the insulation sleeves 30 in order to form the bead 26. The insulation sleeves 30 provide insulation and protection for the conductive wires 22. The insulation sleeves 30 are preferably made of a ceramic material, an organic bonded fiber glass or a polymer-based insulation material.

The thermocouple 16 can be a K-type, J-type, T-type, R-type, C-type, or B-type thermocouple, among others. These types of thermocouples are characterized by the compositions of the conductive wires and are suited for different temperature ranges with different sensitivity. For example, a K-type thermocouple, which includes a Chromel (Ni—Cr alloy) wire and an Alumel (Ni—Al alloy) wire, is a general purpose thermocouple with a temperature range from about 200° C. to about 1200° C. and sensitivity of about 41 μV/° C. A type R thermocouple has noble metal wires and is the most stable of all thermocouples, but has relatively low sensitivity (approximately 10 μV/° C.). A type B thermocouple has a platinum wire and a rhodium wire and is suited for high temperature measurements up to about 1800° C.

Figure 4:
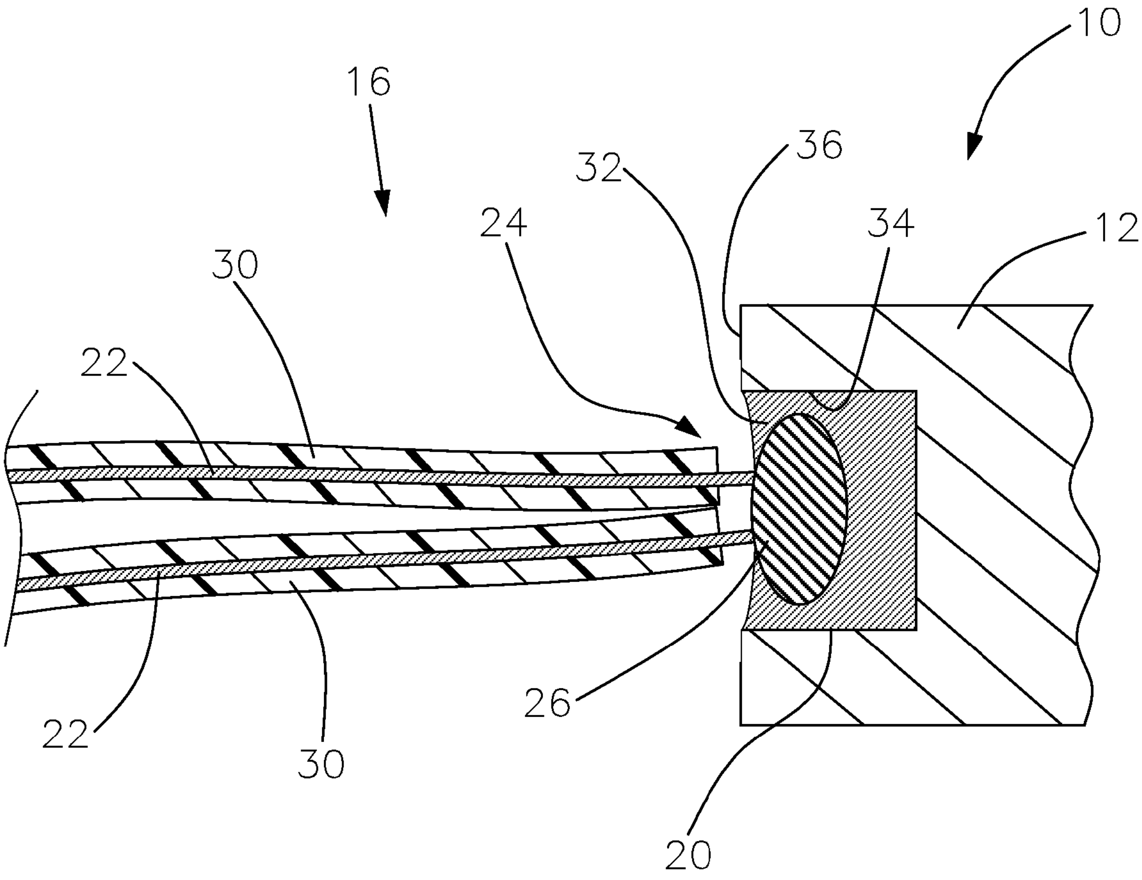
FIG. 4 is an enlarged view, within Detail A of FIG. 3, showing the connection between the ceramic substrate and the thermocouple in accordance with a first embodiment of the present disclosure.

As clearly shown in FIG. 4, the bead 26 is disposed within the recess 20 of the ceramic substrate 12. The recess 20 is substantially filled with an active brazing material 32, which surrounds the bead 26 and secures the bead 26 to the ceramic substrate 12. It should be understood that the bead 26 can be in direct contact with an inner surface 34 of the recess 20 or completely surrounded by the active brazing material 32 while remaining within the scope of the present disclosure.

Figure 5:
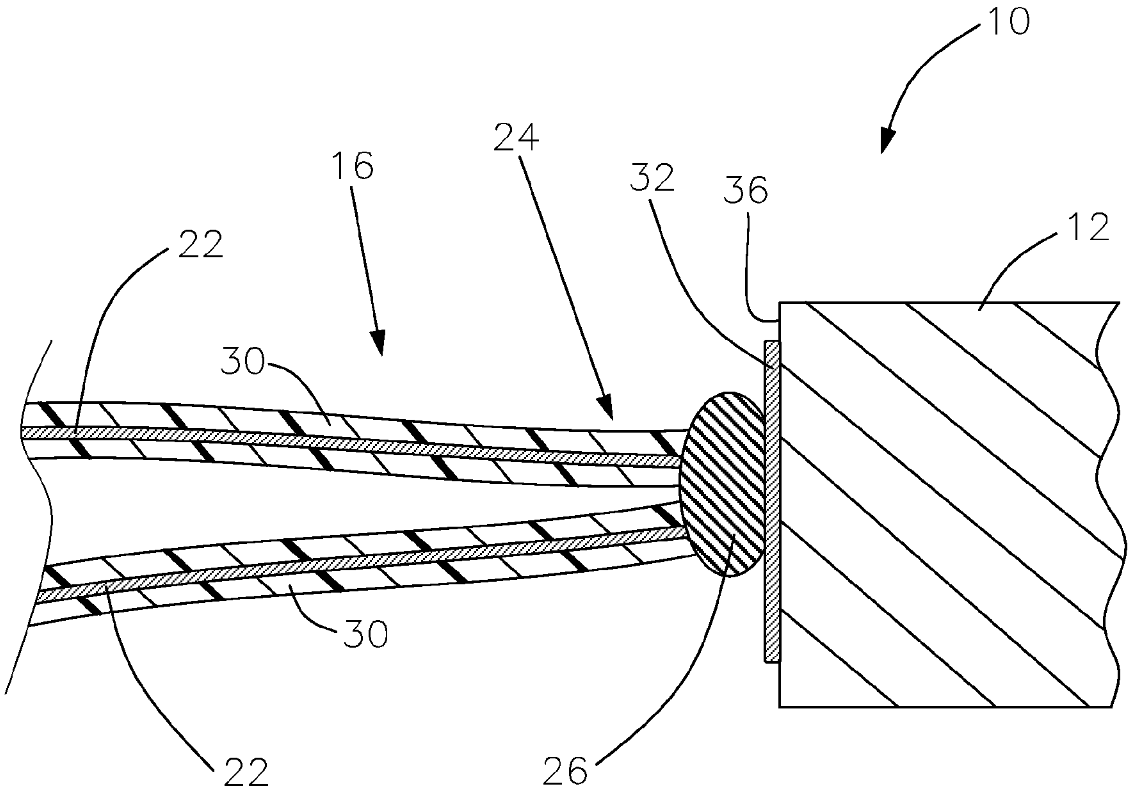
FIG. 5 is an enlarged view, similar to FIG. 4, showing an alternate connection between the ceramic substrate and the thermocouple in accordance with a second embodiment of the present disclosure.

Alternatively, as shown in FIG. 5, the bead 26 is bonded to an exterior surface 36 of the ceramic substrate 12 rather than within a recess 20 as previously described. Preferably, the bead 26 of the thermocouple 16 is in contact with the active brazing material 32, and the active brazing material 32 is in contact with the exterior surface 36 of the ceramic substrate 12. Again, it should be understood that the bead 26 can be in direct contact with the inner surface 34 of the recess 20 or completely surrounded by the active brazing material 32 while remaining within the scope of the present disclosure. The active brazing material 32 is preferably an active brazing alloy. The preferred active brazing alloy includes Ticusil® alloy (Ag—Cu—Ti alloy) sold by Wesgo® Company, silver-ABA® alloy (Ag—Ti alloy) sold by Wesgo® Company, Au—Ni—Ti alloy and Au—Ti alloy.

Figure 6:
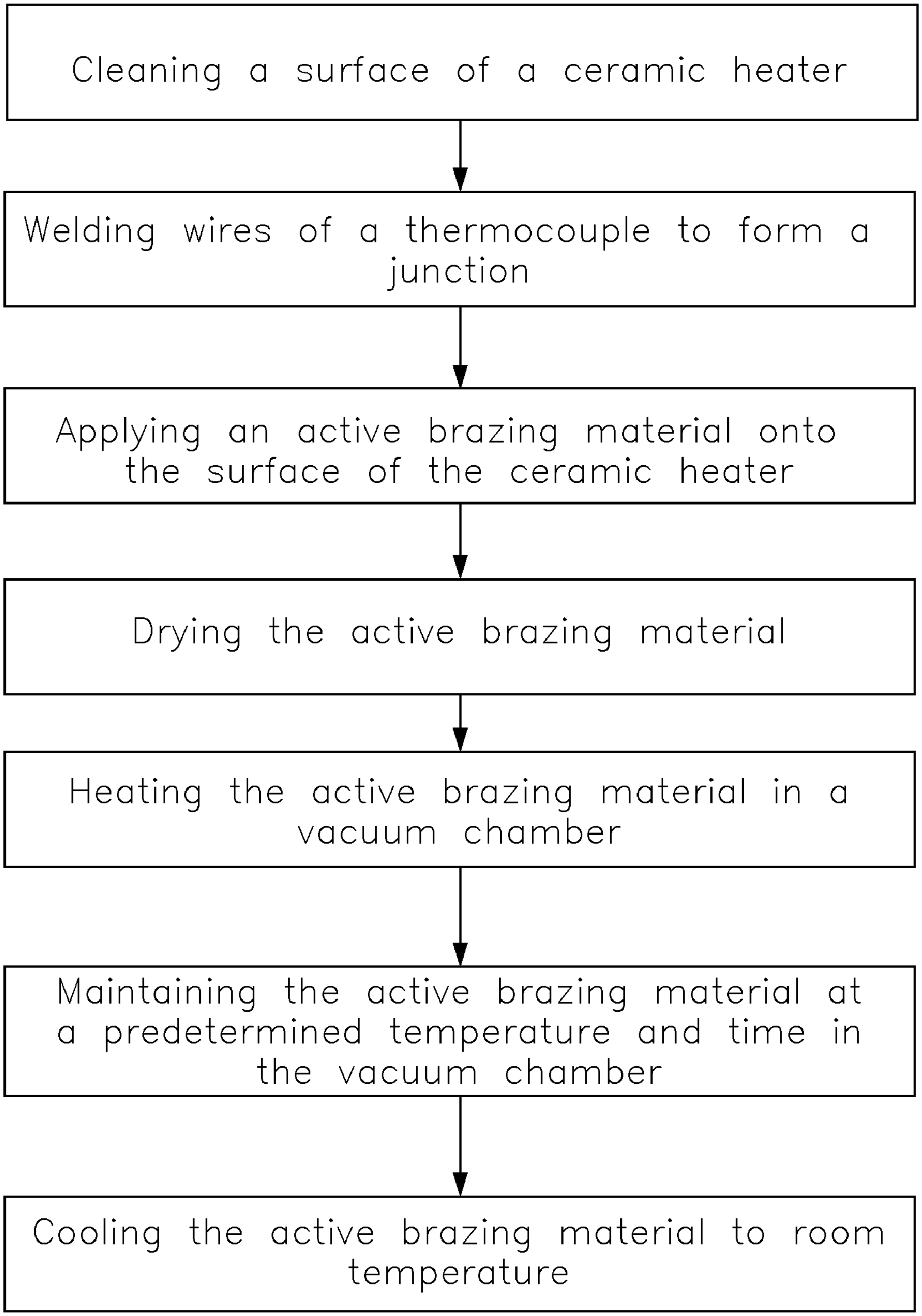
FIG. 6 is a flow diagram showing a method of securing the thermocouple to a ceramic heater in accordance with the teachings of the present disclosure.

Referring now to FIG. 6, a method of securing the thermocouple 16 to the ceramic substrate 12 in accordance with the teachings of the present disclosure is now described. It should be understood that the order of steps illustrated and described herein can be altered or changed while remaining within the scope of the present invention, and as such, the steps are merely exemplary of one form of the present disclosure. First, the surface of the ceramic substrate 12 to which the thermocouple 16 is to be bonded is cleaned. The surface may be the inner surface 34 of the recess 20 or the exterior surface 36 of the ceramic substrate 12 as previously described. Preferably, ultrasound cleaner and acetone or alcohol are used to remove dust particles and grease adhered to the surface. The distal ends 24 of the conductive wires 22 of the thermocouple 16 are welded to form a bead 26, which will function as a hot junction or a measuring junction.

Next, the active brazing material 32 is applied to the recess 20 or the exterior surface 36 of the ceramic substrate 12, followed by placing the bead 26 of the thermocouple 16 on the active brazing material 32. The active brazing material 32 is preferably applied in the form of a paste or a foil, although other forms may be used while remaining within the scope of the present disclosure. When the active brazing material 32 is applied in the form of a paste, the bead 26 can be inserted into the recess 20 before the active brazing material 32 is applied so that the bead 26 is in direct contact with the ceramic substrate 12, i.e., the inner surface 34 of the recess 20. Additionally, a drying process is preferably employed to dry the active brazing material paste. The drying process is preferably performed at a room temperature for a period of time sufficient to evaporate the solvent in the paste.

Then, the ceramic substrate 12 with the thermocouple 16 is placed in a vacuum chamber (not shown) for heating. Preferably, the vacuum is controlled at a pressure of less than about $5\times10^{-6}$ torr during the heating process. The active brazing material 32 and the bead 26 are heated to between about 950° C. and about 1080° C. When a desirable temperature is achieved, the temperature is maintained for a period of about 5 to about 60 minutes. In one form, the active brazing material 32 is heated to about 950° C. and maintained for about 15 minutes at this temperature during the heating process.

After the heating process, the vacuum chamber is cooled to room temperature to allow the active brazing material 32 to solidify. When the active brazing material 32 solidifies, the bead 26 of the thermocouple 16 is directly bonded to the ceramic substrate 12.

Figure 7:
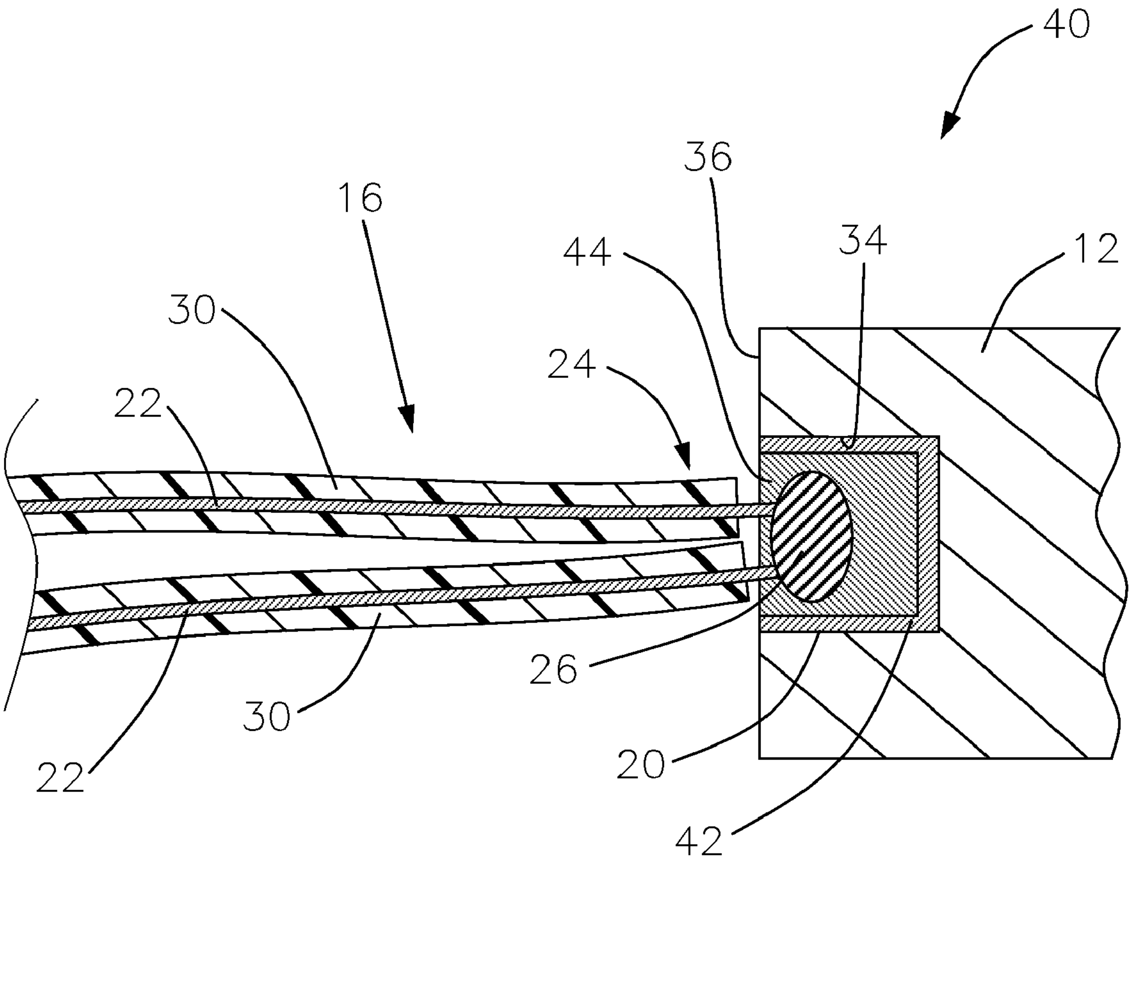
FIG. 7 is an enlarged view, similar to FIG. 4, showing an alternate connection between the ceramic substrate and the thermocouple in accordance with a third embodiment of the present disclosure.

Referring to FIG. 7, a ceramic heater having a thermocouple secured by another method in accordance with the teaching of the present disclosure is generally indicated by reference 40. The ceramic heater 40 has a construction similar to that of the ceramic heater 10 shown in FIGS. 3 to 5, except for the connection between the ceramic substrate 12 and the thermocouple 16. In the following description, corresponding reference numerals indicate like or corresponding parts and features previously described in connection with FIGS. 1 through 5.

FIG. 7 shows that the bead 26 of the thermocouple 16 is disposed in a recess 20 of the ceramic substrate 12. The inner surface 36 of the recess 20 is covered by a metallized layer 42. The bead 26 is disposed in the recess 20 and an ordinary brazing material 44, rather than an active brazing material 32, substantially fills the space between the bead 26 and the metallized layer 42.

Figure 8:
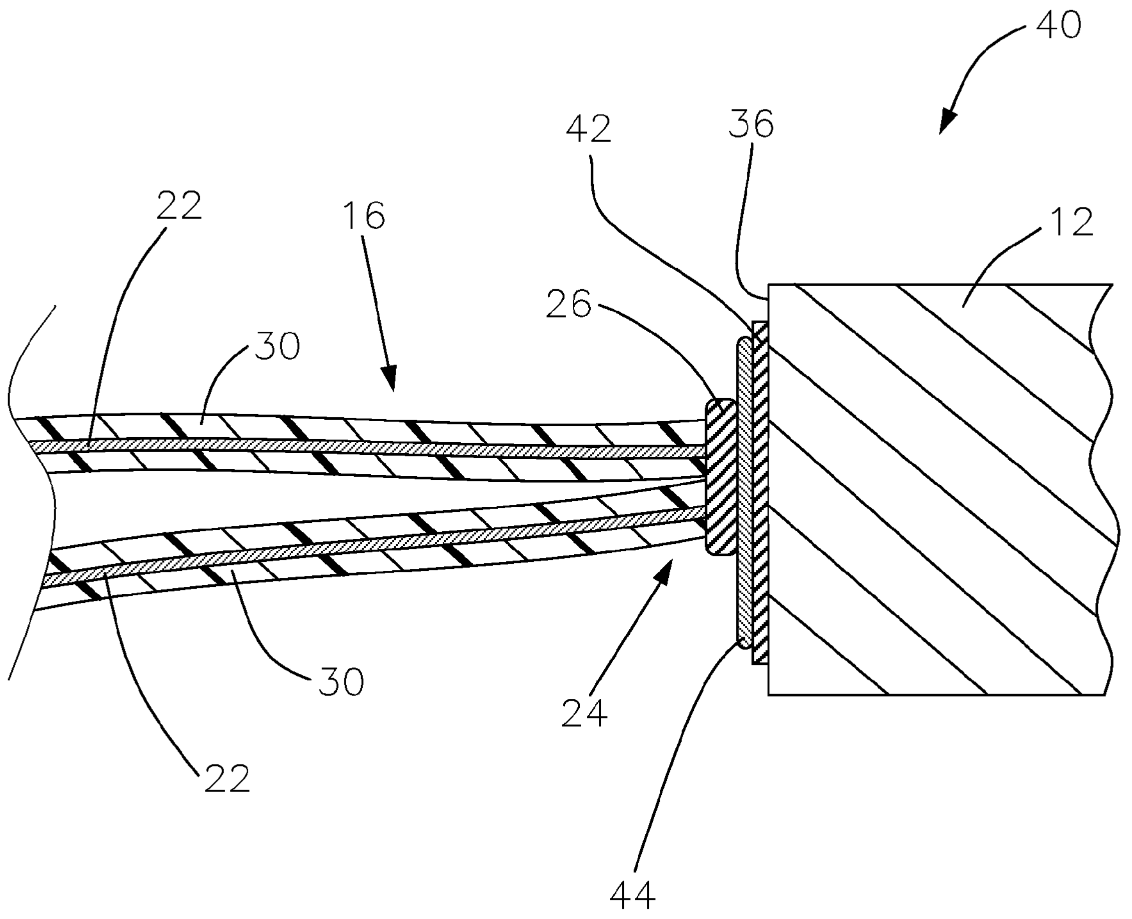
FIG. 8 is an enlarged view, similar to FIG. 7, showing an alternate connection between the ceramic substrate and the thermocouple in accordance with a fourth embodiment of the present disclosure.

Alternatively, the bead 26 of the thermocouple 16 is bonded to an exterior surface 36 of the ceramic substrate 12, as shown in FIG. 8. The metallized layer 42 is disposed between the exterior surface 34 and the ordinary brazing material 44.

Figure 9:
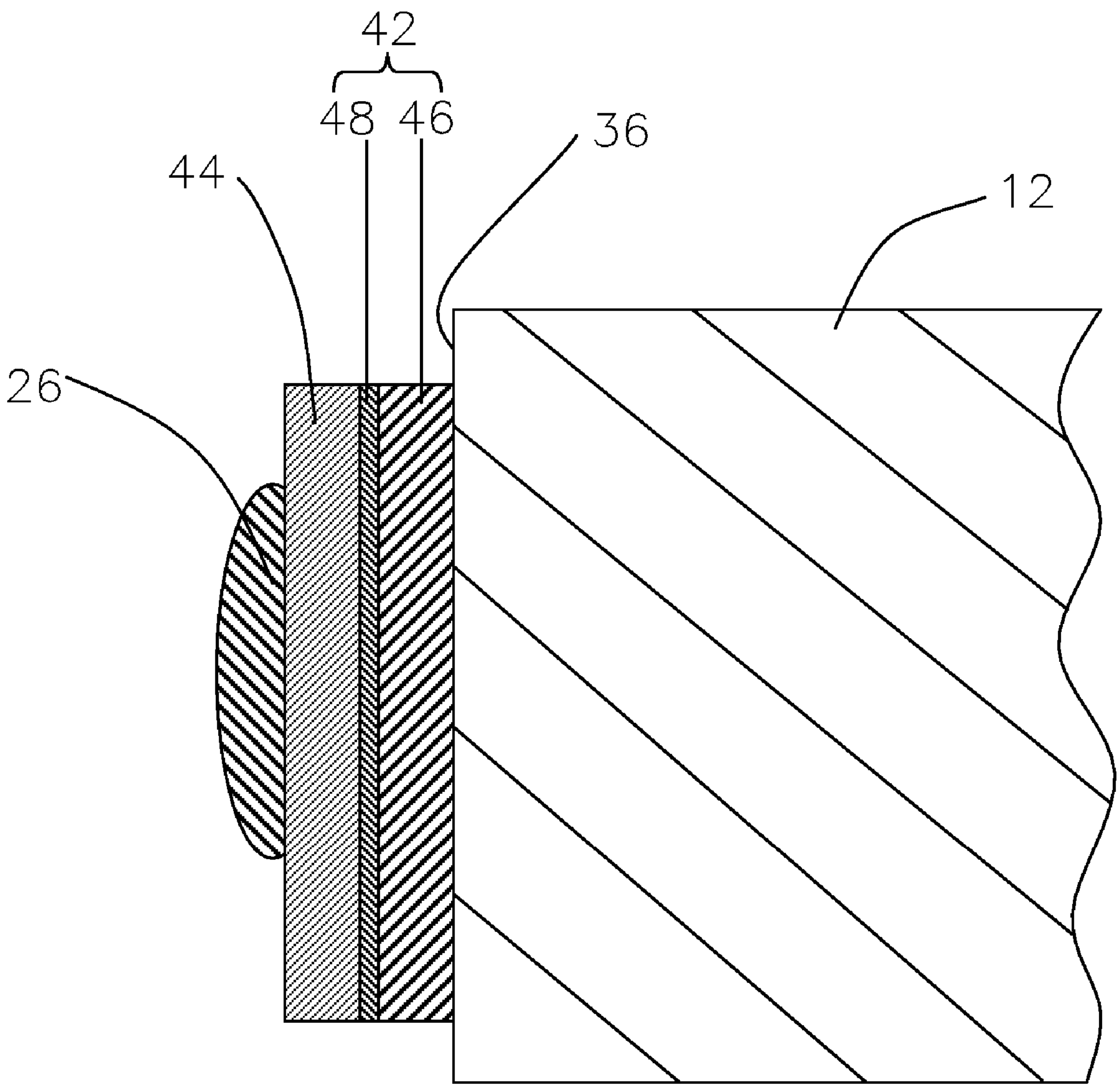
FIG. 9 is a view showing an alternate two-layered construction of a metallized layer and its bonding with the ceramic substrate and the thermocouple, wherein the wires and insulations of the thermocouple are removed for clarity.

The metallized layer 42 can be a single-layered construction as shown in FIG. 8 or a two-layered construction as shown in FIG. 9. When a single-layered construction is preferred, the metallized layer 42 is preferably a Ti layer having a thickness of about 0.1 to 1 μm and is formed by electroless plating. When a two-layered construction is preferred, the metallized layer 42 preferably includes a first layer 46 in contact with the ceramic substrate 12 and a second layer 48 disposed between the first layer 46 and the ordinary brazing material 44. The first layer 46 is a primary layer and is preferably formed from a mixture of Mo, MnO, glass frit and organic bonder. The second layer 48 is preferably a Ni layer, Cu layer or Au layer and is a thin layer having a thickness smaller than that of the first layer 46. The thickness of the second layer 48 is preferably about 2 to 5 μm. The first layer 46 serves as a bonding layer for bonding the metallic second layer 48 to the ceramic substrate 12 so that the thermocouple 16 can be bonded to the ceramic substrate 12 through the second layer 48 by the ordinary brazing material 44.

The preferred ordinary brazing material 44 includes Ag—Cu alloy or Au—Ni alloy.

Figure 10:
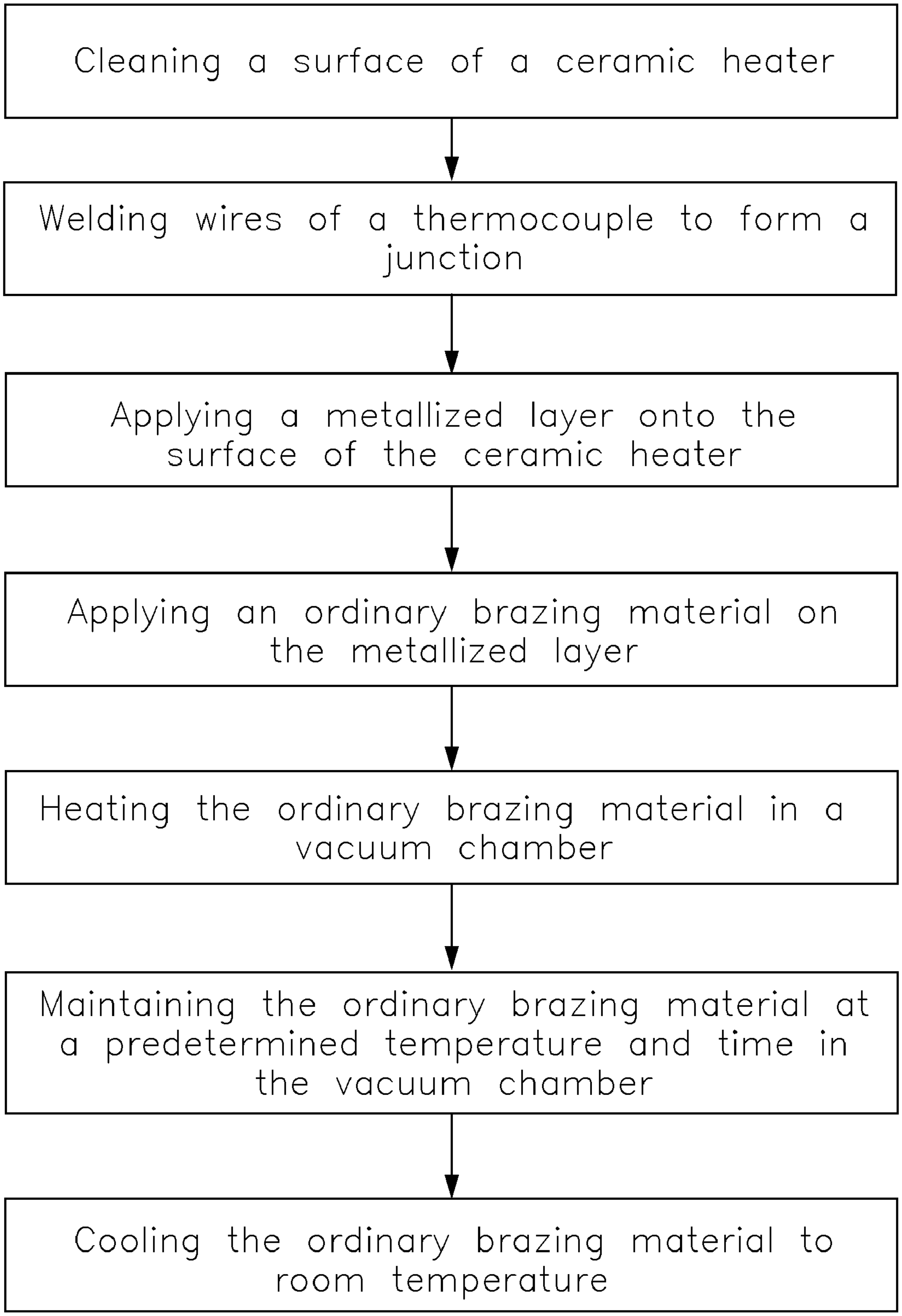
FIG. 10 is a flow diagram showing another method of securing the thermocouple to the ceramic heater in accordance with the teachings of the present disclosure.

Referring to FIG. 10, the second method of securing the thermocouple 16 to the ceramic substrate 12 in accordance with the teachings of the present disclosure is now described. As previously set forth, the order of steps illustrated and described herein can be altered or changed while remaining within the scope of the present invention. First, the surface of the ceramic substrate 12 to which the thermocouple 16 is to be bonded is cleaned. The surface may be the inner surface 34 of the recess 20 or the exterior surface 36 of the ceramic substrate 12 as previously described. Then, the wires 22 of the thermocouple 16 are welded to form a bead 26.

Next, the metallized layer 42 is formed on the inner surface 34 of the recess 20 or the exterior surface 36 of the ceramic substrate 12. The metallized layer 42 may be formed by sputtering a thin Ti layer. Alternatively, the metallized layer 42 may be formed by first forming a first layer 46 on the ceramic substrate 12, followed by forming a second layer 48 on the first layer 46. In forming the first layer 46, a paste including a mixture of Mo, MnO, glass frit, organic bonder and solvent is prepared and applied to the ceramic substrate 12. The ceramic substrate 12 and the paste are then fired in an atmosphere of a forming gas. Preferably, the forming gas is a mixture of nitrogen and hydrogen in a molecular ratio of 4:1, or a cracked ammonia, which is a mixture of hydrogen and nitrogen in a molecular ratio of 3:1. When the firing process is completed, the solvent is removed from the paste and the paste is solidified and attached to the ceramic substrate 12.

After the first layer 46 is formed, the second layer 48, which may be a Ni, Cu, or Au layer, is applied onto the first layer 46 by electrodeless plating method, thereby completing the metallized layer 42.

Upon completion of the metallized layer 42, whether a single-layered or two-layered construction, the ordinary brazing material 44 is placed on the metallized layer 42 and the bead 26 of the thermocouple 16 is placed on the ordinary brazing material 44. The ordinary brazing material 44 is then melted and solidified, thereby completing bonding the thermocouple 16 to the ceramic substrate 12. Since the process of heating and solidifying the ordinary brazing material 44 is substantially similar to the process of heating and solidifying the active brazing material 32 in connection with FIGS. 4-8, the description thereof is omitted herein for clarity.

According to the present disclosure, since the bead 26 of the thermocouple 16 is directly bonded to the ceramic substrate 12, the heat from the ceramic substrate 12 is directly transferred to the bead 26 of the thermocouple 16. As a result, the temperature of the bead 26 reflects the temperature of the ceramic substrate 12 almost instantaneously and thus the temperature of the ceramic heater 10 can be more accurately measured. Additionally, by using the active brazing material or the ordinary brazing material coupled with the metallized layer, the thermocouple 16 has long term stability even when exposed to elevated temperatures.

The ceramic heater 10 according to the present disclosure has a variety of applications. For example, the ceramic heater 10 can be used in semiconductor back-end die bonding apparatuses and medical devices. The ceramic heater 10 is preferably used for heating an object at a relatively fast ramp rate.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of securing a thermocouple including a pair of wires that define a junction to a ceramic substrate, the method comprising directly bonding the junction of the thermocouple to the ceramic substrate.

2. The method according to claim 1, wherein the directly bonding is achieved by using an active brazing material.

3. The method according to claim 2, further comprising applying the active brazing material in the form of a paste to the ceramic substrate and placing the junction of the thermocouple on the active brazing material paste.

4. The method according to claim 3, further comprising heating the active brazing material on which the junction of the thermocouple is disposed to about 950° C. to about 1080° C. and maintaining the temperature for about 5 to 60 minutes.

5. The method according to claim 4, wherein the heating is performed in a vacuum chamber of less than 5×10-6 torr.

6. The method according to claim 2, wherein the active brazing material is filled in a recess of the ceramic substrate.

7. The method according to claim 2, wherein the active brazing material is applied to an exterior surface of the ceramic substrate.

8. The method according to claim 1, wherein the junction is formed by welding the wires at distal end portions of the wires.

9. The method according to claim 1, wherein the directly bonding comprises providing at least one metallized layer on the ceramic substrate and bonding the junction to the metallized layer by a brazing material.

10. The method according to claim 9, wherein providing a metallized layer comprises applying a mixture of Mo, MnO, glass frit, organic bonder and solvent on the ceramic substrate to form a first layer, and applying a material selected from a group consisting of Ni, Cu and Au to form a second layer.

11. The method according to claim 9, wherein providing a metallized layer comprises providing a Ti layer on the ceramic substrate.

12. A method of securing a thermocouple comprising a pair of wires that define a junction to a ceramic substrate comprising:

cleaning a surface of the ceramic substrate;

applying an active brazing material onto the surface of the ceramic substrate;

placing the junction of the thermocouple on the active brazing material;

drying the active brazing material;

heating the active brazing material;

maintaining the active brazing material at a predetermined temperature and time; and cooling the active brazing material to room temperature.

13. The method according to claim 12, wherein the active brazing material is in a form selected from a group consisting of foil and paste.

14. The method according to claim 12, wherein the heating of the active brazing material is performed in a vacuum chamber.

15. A method of securing a thermocouple including a pair of wires that define a junction to a ceramic substrate, the method comprising directly bonding the junction of the thermocouple to the ceramic substrate, wherein the directly bonding is achieved by using an active brazing material.

16. The method according to claim 15, further comprising applying the active brazing material in the form of a paste to the ceramic substrate and placing the junction of the thermocouple on the active brazing material paste.

17. The method according to claim 16, further comprising heating the active brazing material on which the junction of the thermocouple is disposed to about 950° C. to about 1080° C. and maintaining the temperature for about 5 to 60 minutes.

18. The method according to claim 17, wherein the heating is performed in a vacuum chamber of less than 5×10-6 torr.

19. The method according to claim 15, wherein the active brazing material is filled in a recess of the ceramic substrate.

20. The method according to claim 15, wherein the active brazing material is applied to an exterior surface of the ceramic substrate.

21. The method according to claim 15, further comprising applying the active brazing material in the form of a foil to the ceramic substrate and placing the junction of the thermocouple on the active brazing material foil.

22. A method of securing a thermocouple comprising a pair of wires that define a junction to a ceramic substrate comprising:

cleaning a surface of the ceramic substrate;

applying a metallized layer to the surface of the ceramic substrate;

applying an ordinary brazing material onto the metallized layer;

placing the junction of the thermocouple on the ordinary brazing material;

heating the ordinary brazing material;

maintaining the ordinary brazing material at a predetermined temperature; and cooling the ordinary brazing material to room temperature.

23. The method according to claim 22, wherein the metallized layer is applied by forming a first layer in contact with the ceramic substrate and a second layer disposed between the first layer and the ordinary brazing material.

24. The method according to claim 22, wherein the heating of the ordinary brazing material is performed in a vacuum chamber.

* * * * *